(12) United States Patent
Miller et al.

(10) Patent No.: US 9,798,945 B2
(45) Date of Patent: Oct. 24, 2017

(54) METHOD AND APPARATUS FOR CROWDSOURCED VEHICLE IDENTIFICATION

(71) Applicant: Ford Global Technologies, LLC, Dearborn, MI (US)

(72) Inventors: Kenneth James Miller, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 14/729,109

(22) Filed: Jun. 3, 2015

(65) Prior Publication Data

US 2016/0358031 A1 Dec. 8, 2016

(51) Int. Cl.
| | |
|---|---|
| *G06K 9/00* | (2006.01) |
| *G06K 9/32* | (2006.01) |
| *G08G 1/017* | (2006.01) |
| *B60R 1/00* | (2006.01) |
| *G08G 1/00* | (2006.01) |

(52) U.S. Cl.
CPC ............ *G06K 9/3258* (2013.01); *B60R 1/00* (2013.01); *G08G 1/0175* (2013.01); *G08G 1/205* (2013.01); *G06K 2209/15* (2013.01)

(58) Field of Classification Search
CPC .... G06K 9/3258; G06K 2209/15; B60R 1/00; G08G 1/0175
USPC ......................................................... 382/105
See application file for complete search history.

(56) References Cited

U.S. PATENT DOCUMENTS

| | | |
|---|---|---|
| 8,781,169 B2 | 7/2014 | Jackson et al. |
| 2012/0106801 A1* | 5/2012 | Jackson ................. G08G 1/205 382/105 |
| 2014/0072177 A1 | 3/2014 | Chou et al. |

FOREIGN PATENT DOCUMENTS

CN 203766705 U 8/2014

\* cited by examiner

*Primary Examiner* — Gregory F Cunningham
(74) *Attorney, Agent, or Firm* — Jennifer M. Stec; Brooks Kushman P.C.

(57) ABSTRACT

A system includes a processor configured to obtain an image of a vehicle plate. The processor is also configured to determine identification characters present in the image. The processor is further configured to compare the identification characters to a list of sought-vehicle plates and report a match between the identification characters and a plate on the list of sought-vehicle plates.

9 Claims, 4 Drawing Sheets

METHOD AND APPARATUS FOR CROWDSOURCED VEHICLE IDENTIFICATION

TECHNICAL FIELD

The illustrative embodiments generally relate to a method and apparatus for crowdsourced vehicle identification.

BACKGROUND

A current deliverable focus of many automotive original equipment manufacturers (OEMs) is mobility and mobility-related solutions. Customers want the benefits of a networked environment, and this environment can be enhanced through crowdsourcing. Further, if given the option, many customers would participate in crowdsourcing that can help add information to a network from which those customers benefit. At the same time, participants like to maintain a level of privacy (e.g., a participant in crowdsourcing information at his/her vehicle location may not want personal location information transmitted, tracked, and associated with the vehicle at all times). One application that can benefit from crowdsourcing is locating missing assets.

One present example of plate identification includes an identification device characterized in that: a video camera is connected with an image processing circuit; the image processing circuit is connected with a license plate positioning circuit; the license plate positioning circuit is connected with a license plate character segmentation circuit; the license plate character segmentation circuit is connected with a license plate character identification circuit; and the license plate character identification circuit is connected with a computer. The image processing technology for vehicle license plate identification has the advantages and beneficial effects that: the work is automatic and the installation is convenient.

In another example, a method for identifying vehicle license plates includes mounting a server apparatus, and establishing a vehicle database and a vehicle license plate identification library in the server apparatus to generate vehicle data and a vehicle license plate identification program; establishing a communication link, and receiving the vehicle data and the vehicle license plate identification program by the mobile device, and installing the vehicle license plate identification program and storing the vehicle data; capturing a license plate number of a vehicle by a camera module mounted in the mobile device for generating an image and then analyzing the plate number in the image by an analyzing program to generate an analysis result; comparing the analysis result with the vehicle data by a comparison module of the mobile device for generating a comparison result; and displaying the comparison result.

In yet another example, a vehicle tracking and locating system provides information to a user about a vehicle of interest, and includes a database controller in operative communication with a database, and configured to receive data corresponding to vehicles from a plurality of client sources, and configured to save the data as information records corresponding to each client source. A plurality of external communication devices transmit a data request by the user corresponding to the vehicle of interest. A request server receives the data request in one a variety of communication formats. An input request processor operatively coupled to the request server is configured to obtain information records from the database corresponding to the data request. An output processor operatively coupled to the request server provides data of interest from the obtained information records for transmission to the respective communication device to satisfy the user request.

SUMMARY

In a first illustrative example, a system includes a processor configured to obtain an image of a vehicle plate. The processor is also configured to determine identification characters present in the image. The processor is further configured to compare the identification characters to a list of sought-vehicle plates and report a match between the identification characters and a plate on the list of sought-vehicle plates.

In a second illustrative embodiment, a system includes a processor configured to receive a locate request to find a vehicle plate. The processor is also configured to verify that the vehicle plate is eligible as a search-subject. The processor is further configured to send a search request to reporting vehicles for a search for the vehicle plate. Also, the processor is configured to receive a match from a first reporting vehicle, responsive to the search request and notify the user of the match corresponding to the vehicle plate.

In a third illustrative embodiment, a system includes a processor configured to receive a request to locate a missing vehicle. The processor is also configured to utilize a vehicle system to confirm an identity of the missing vehicle as a vehicle in proximity to a reporting vehicle containing the processor. The processor is further configured to report identification of the missing vehicle, as well as a GPS location of the reporting vehicle, upon confirmation of the identity of the missing vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
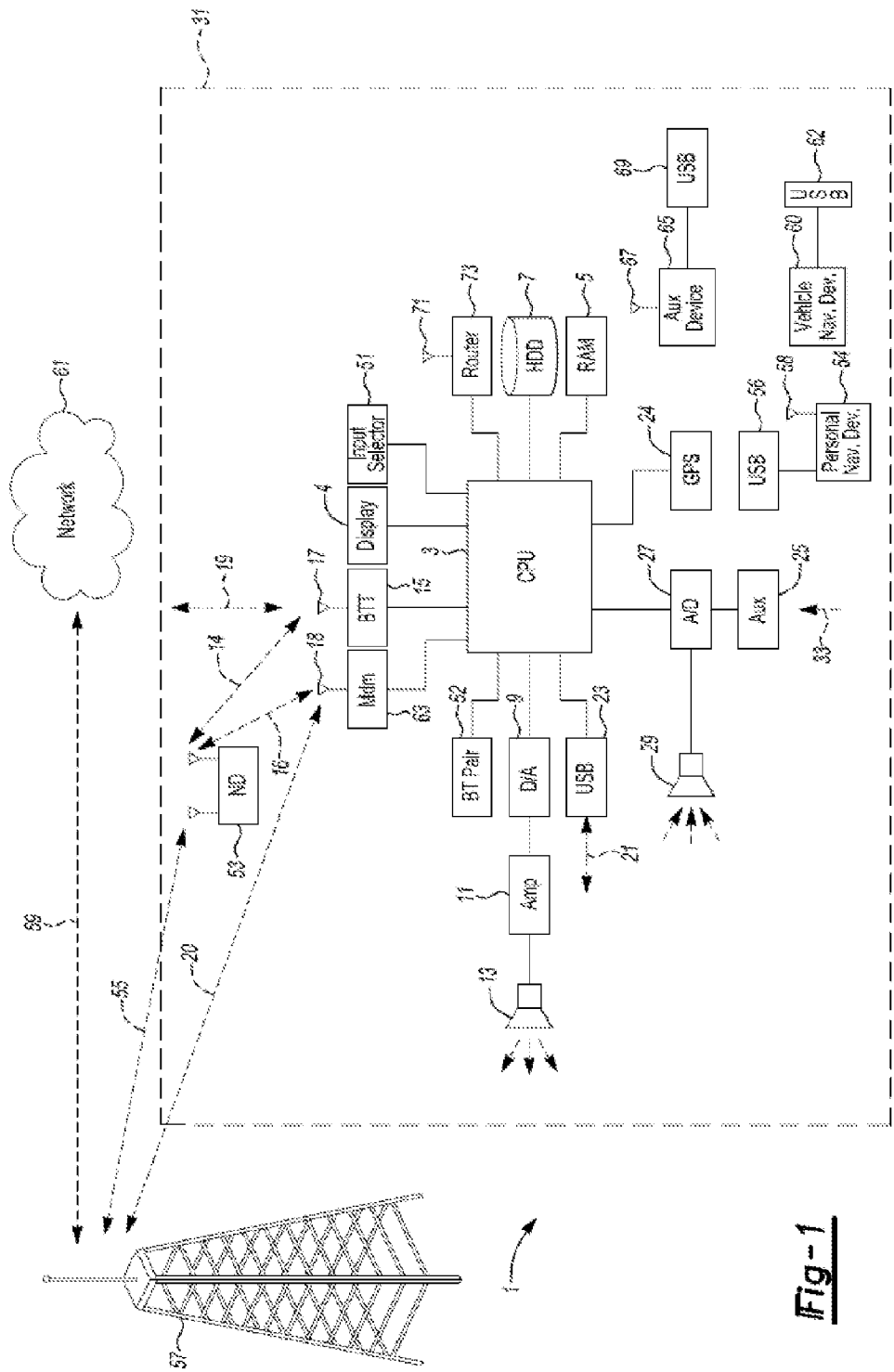
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

While the previous solutions to the issues of vehicle tracking allow identification of a vehicle license plate from an image, and requesting information from a database of identified vehicles, much room for improvement in this area still exists.

The illustrative embodiments present a method to use crowdsourcing to identify the license plate of a missing car using vehicle camera technology combined with a method for private customer control of the information and secure transmission of the information.

In these example, no information may be used until the request to search for the missing car is made. The method allows the customer to request a search. When the request for crowdsourcing information is made, the customer accesses the a secure database, in which they have enrolled or otherwise have access to. The secure database sends an encrypted list of license plate numbers to all participating members' vehicles, where it is decrypted and used within a computer search program. The license plate numbers being searched may be never known to anyone but the individual requestors, who register their plate numbers when they enroll to avoid mischievous or unwarranted use by people searching for other people's cars. The identity of the vehicle taking the picture and sending the information may be randomized/not identified.

Through the examples shown above and herein, a network of anonymous resource vehicles can be used in an on-demand fashion to track down missing assets, without over-taxing resources or unnecessarily storing vast volumes of unneeded data. Both searcher/participant and resource vehicle identities can be protected and ensured, and at the same time a vast network of resource vehicles can be called on for assistance at the drop of a hat.

In an illustrative example, a crowdsourcing arrangement would involve enrolling in a service where a customer's vehicle would search for a license plate number and automatically send a secure encrypted communication with the plate, location and time to the cloud when a requested plate number is found.

To enroll, a vehicle owner would supply, for example, their license plate number, name, address and VIN. A customer database may confirm the owner information for the VIN supplied, and calls the customer automatically using a registered phone number to confirm the request is from the vehicle owner. If a customer phone number is not registered, then other reliable databases that connect a customer vehicle owner to a phone number may be used.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Figure 2:
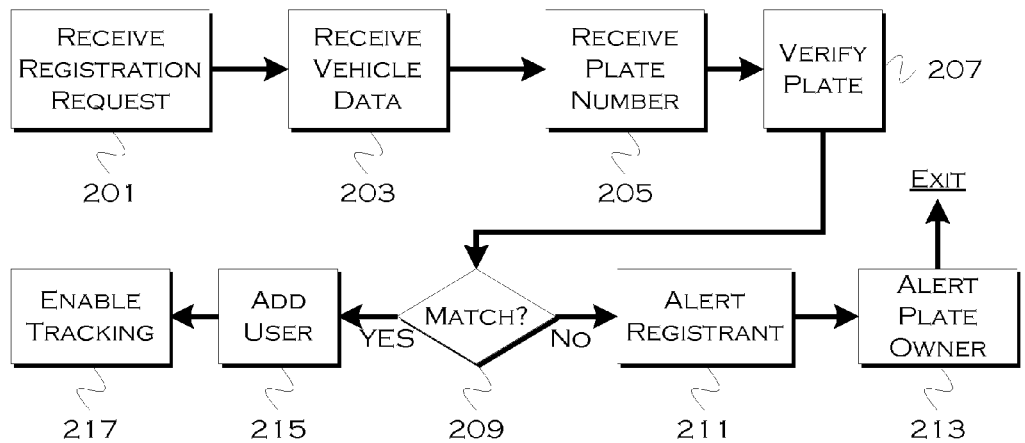
FIG. 2 shows an illustrative registration process.

FIG. 2 shows an illustrative registration process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a user registers as a participant. Depending on an implementation, this may mean the user is electing to allow use of a vehicle for finding other vehicles (i.e., participate in the crowdsourcing) or may simply be a registration of a particular vehicle for eligibility in being tracked down. For example, in one model, use of the vehicle tracking may be free if a user participates in finding other vehicles, but may cost some nominal amount if the user wants the service-side only, without participating in locating other vehicles. This encourages users to participate in the crowdsourcing. In other examples, the service may only be available to participating users (i.e., searchers) for example.

In this illustrative example, the process receives a request from a user to register a plate for tracking (thereby allowing tracking of the vehicle to which the plate is affixed or intended to be affixed) 201. It would also be possible for a user to register at the time of purchase or lease, where user identity could be easily verified, but this process allows for a later registration if the user elects to participate at a later point or, for example, purchases a used vehicle from another owner.

In conjunction with the registration request, the process receives user identifying information 203 such as, for example, a vehicle identification number (VIN) allowing a specific vehicle to be identified. This information may be used in cross-reference with a license plate number, also received 205. Further, if desired (although not shown), a verification step may involve placing a phone call to a registered owner or lessee of a vehicle, to confirm the tracking request.

Since a request to track a vehicle may be open to the possibility of abuse, steps may be taken to mitigate any chance that someone other than the owner is requesting tracking. These include, for example, the aforementioned phone call and/or the cross referencing with a license plate and vehicle identifying information 207. Once the plate has been verified as corresponding to the requesting vehicle 209 (in this example, the request comes from the vehicle itself, input through a vehicle display, or from a logged-in user who requests the plate tracking in conjunction with the VIN, which may include being logged into a user account corresponding to the vehicle), the process can add the license plate and/or user as permitted to be tracked 215. Again, in these examples, the license plate itself is tracked, but through finding the license plate the vehicle and any occupants can be found, so the security measures are taken to prevent abuse. Tracking is then enabled for any requests pertaining to the registered license plate 217.

If there is no match between the VIN/vehicle and the license plate, in this example, the process will alert the party attempting to register the plate for tracking 211. This can avoid the user accidentally thinking the plate is registered if the wrong information is input. Also, in this example, the person to whom the plate and/or vehicle belongs may be alerted 213. If there is no record of a plate owner, it may be the case that only the VIN-corresponding vehicle owner is notified. In other instances, the plate owner may also be notified so that both parties know that a tracking request was submitted on behalf of their plate/vehicle. The notification steps can be amended as desired, and notification upon a match error may not always occur, to avoid unnecessarily alarming people when a mistyped alpha-numeric character is input.

Once the registration process is successfully completed, the user can then request tracking of the vehicle plate via the crowdsourced network at a later date, and receive any information pertaining to the location of the vehicle.

Figure 3:
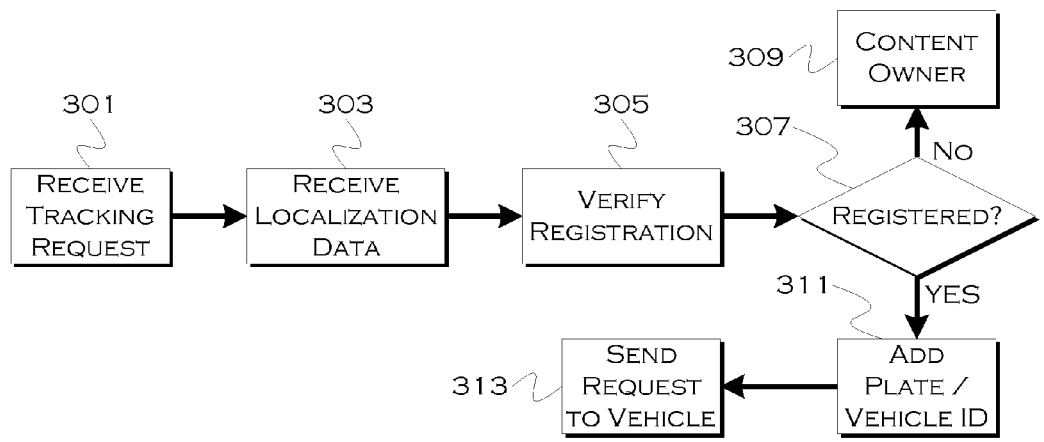
FIG. 3 shows an illustrative tracking request process.

FIG. 3 shows an illustrative tracking request process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a user initiates a tracking request for a vehicle. In the illustrative embodiments, tracking is done on an on-demand basis, and tracking requests are sent to vehicles based on requested plates for tracking Here, the process receives a request to track a plate, input via a mobile app, a PC or similar connection 301. If a vehicle is stolen or missing, or, for example, if a parent wants to know where a teenage driver is located, this sort of request can be used to track down a license plate (and the corresponding vehicle).

Also, in this example, localization data is received 303. Although not necessary, localization data can be used to narrow the subset of vehicles to which a request is sent, or included with a request sent to all vehicles (and then a vehicle can "determine" if it is in an appropriate locality). For example, the user inputting the request may be asked where the vehicle was last located, or where the expected location is. The localization data may be broad (a zip code, city or state) or may be very specific (an address). The data can be used, along with time information if input (i.e., when the vehicle was last known to be in the locality) to determine a likely range where the vehicle may have traveled under its own power. On the other hand, the tracking request may be widely broadcast without any localization data if the network can handle the volume of requests.

Since the data about plates to be tracked may be transmitted in relatively short-form (i.e., an encrypted list of plate identifiers in a least-amount-of-data scenario), it is possible that all plates to be tracked can be transmitted to all participating vehicles. On the other hand, given network and data transfer constraints, it may be desirable to transmit the request to a subset of all vehicles, which are in an expected proximity to where the vehicle might be located (such as, but not limited to, a perimeter bounded area defined by the distance a vehicle could have traveled at a reasonable top speed within a time since the vehicle was at a last known location).

Once the appropriate request and accompanying data (if desired) have been received, the process may verify that the user is registered to track the vehicle 305. This may include ensuring that a vehicle has been registered for tracking and that a user is registered to track a particular vehicle. If the verification process succeeds 307, the process can add the vehicle plate and/or wireless identification number (more on this below) to a list of vehicles to be tracked 311. The updated tracking list can then be sent to all or some appropriate subset (such as location-based) list of vehicles for tracking 313. If the request cannot be verified, in this example, a plate and/or vehicle owner may be notified that a tracking request was submitted for their plate or vehicle 309.

Figure 4A:
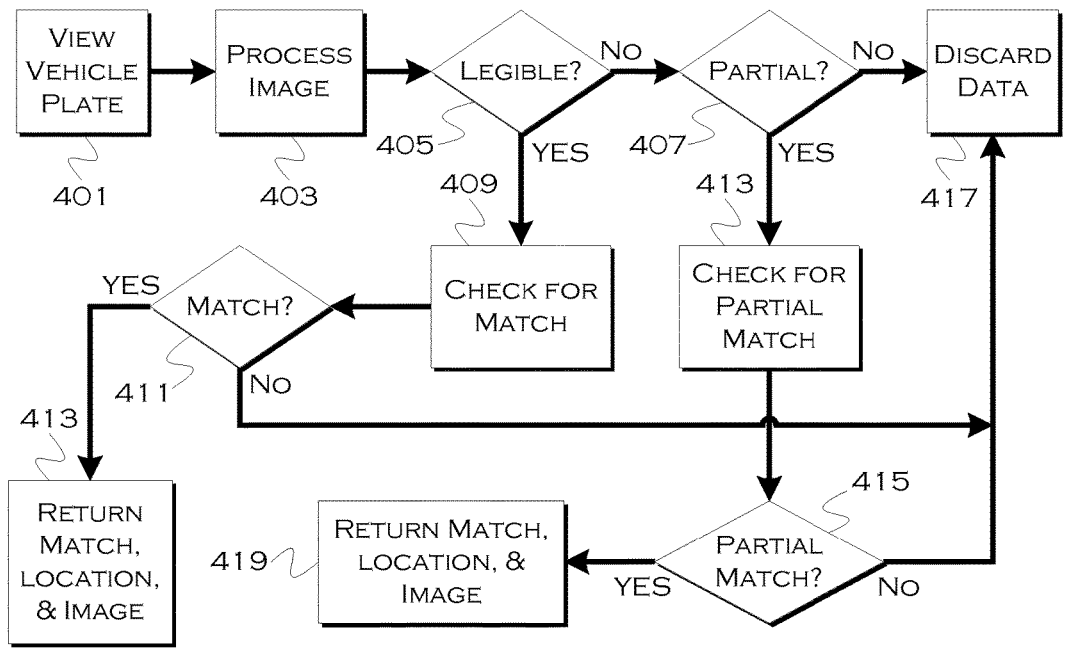
FIGS. 4A and 4B show illustrative processes for vehicle identification.
Figure 4B:
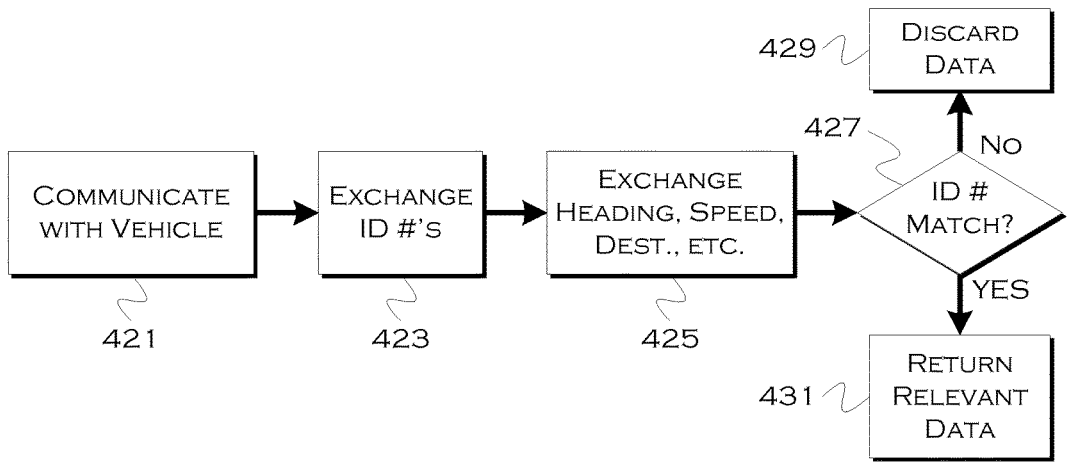

FIGS. 4A and 4B show illustrative processes for vehicle identification. With respect to the illustrative embodiments described in these figures, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the example shown in FIG. 4A, a process run on a vehicle attempts to determine the license plate numbers of any plate visible by a vehicle camera. These can be plates seen in traffic, in a parking lot, partially glimpsed and obstructed by other vehicles, etc. Here, the camera receives an image including one or more license plates (or partial license plates) 401. The image is processed to identify the license plates in the image, and extract the character data (e.g., letters and numbers) from that plate 403.

Since license plates are exposed to the elements, they are subject to deterioration, dirtying and obscuration by snow and other environmental factors. Accordingly, it may not always be possible to pick out identifying information from a license plate. In this process, the executing system attempts to determine the letters and number as best possible, and then determines if a legible solution was found 405. If all letters and numbers cannot be identified, the process determines if a partial identification was possible 407. The partial identification can still be used as a "guess" at a vehicle identity, and may be used to focus a search to a particular area if another vehicle can confirm or better read an obscured or degraded plate. If there is not even a partial set of data (or, for example, if too few letters/numbers are available) then the data can be discarded 417.

If the plate was fully legible, the process checks the read letters/numbers against a list of sought plates 409. If the plate is on the list and there is a match 411, the process may return a current location, the speed and heading (or parked state) of the identifying vehicle, an image of the plate (for verification purposes, for example) and any other appropriate information 413. In order to protect the privacy of the reporting entity, reporting vehicle information may be scrubbed and/or never transmitted, but the returned data of the vehicle location and heading can be usable to determine a very close approximation of the location of the sought-for vehicle. If the legible plate does not match any sought-for plate on the list, the data is discarded in this example.

If there is a partial match, the partial identifiers are compared to the sought-for plate list 413. For example, if the camera could recognize AN12-- (where the - represent illegible or obstructed characters), and the list contained a plate request for AN12FF, then a partial match would be present. If there is a partial match 415, the process can again report the location, speed, heading, image, etc. 419 for further verification. If there is no match, the data can be discarded.

FIG. 4B shows an illustrative example of another vehicle tracking process that relies on vehicle-to-vehicle communication via wireless transmission. In this example, a vehicle can broadcast an identifier (license plate, vehicle ID, VIN or other suitable identifier), which can be encrypted and decryptable by searching vehicles. For example, this data could be received by other local vehicles via BLUETOOTH and decrypted for comparison to search requests. In this example, the system does not need to actually "see" the vehicle. This has both advantages and disadvantages. Since the vehicle is not necessarily seen, its location may only loosely correspond to the reporting vehicle's location. On the other hand, location data could be included in the identifier broadcast if desired. Also, it would be easier to "fake" a vehicle signal using this system, since a physical picture of the vehicle is not present. But, at the same time, this would allow vehicles next to and ahead of a subject vehicle (i.e., vehicles which cannot "see" the vehicle) to detect the presence of the vehicle. This example is presented as another illustration of how a vehicle could be tracked using crowdsourcing.

In FIG. 4B, a reporting vehicle communicates with a possible subject vehicle 421 (such as receiving broadcast identification). The communicating vehicles can exchange data 423 (i.e., the reporting vehicle can also report itself to the subject vehicle, since both are possible participants in the system) or the exchange can be a one-way receipt of data by the reporting vehicle. Also, if desired, location information, speed, heading, etc. can be received or exchanged if desired 425. This may make it easier to pinpoint the location of an unseen vehicle.

As part of the request, some form of unique vehicle identifier is received (license plate, VIN, ID #, etc.) and if the ID matches an ID on a list of sought-vehicles 427, the process can return the relevant data 431 (e.g., confirm the match, return speed, location, heading, etc.). If there is no match, the received data can again be discarded 429. It is also possible to retain data for some period of time, such as until memory dictates discarding data, instead of discarding data immediately, or to report the data to a remote resource prior to discarding, but in the illustrative examples, the data is discarded upon the failure to match any sought vehicles.

Prior to sending the list of plates/identifiers, or upon receipt of the list, a processor can determine the appropriateness/correspondence of any plates on the list based on a present vehicle location. That is, if the list contains an initial vehicle location and a time-last-seen at the location, the processor can determine if the vehicle could possibly be located at the processor's current location, if the determination is made at the vehicle. On the other hand, if the determination is made before sending out the request, the processor can determine where a vehicle might possibly be located, and send the request to vehicles currently traveling or whose heading/destination/speed/location indicates that those vehicles might soon be traveling within a bounded perimeter in which the subject vehicle might be located. Sorts such as this can be used to limit the scope of requests if too many requests exist for a network infrastructure to handle.

Figure 5:
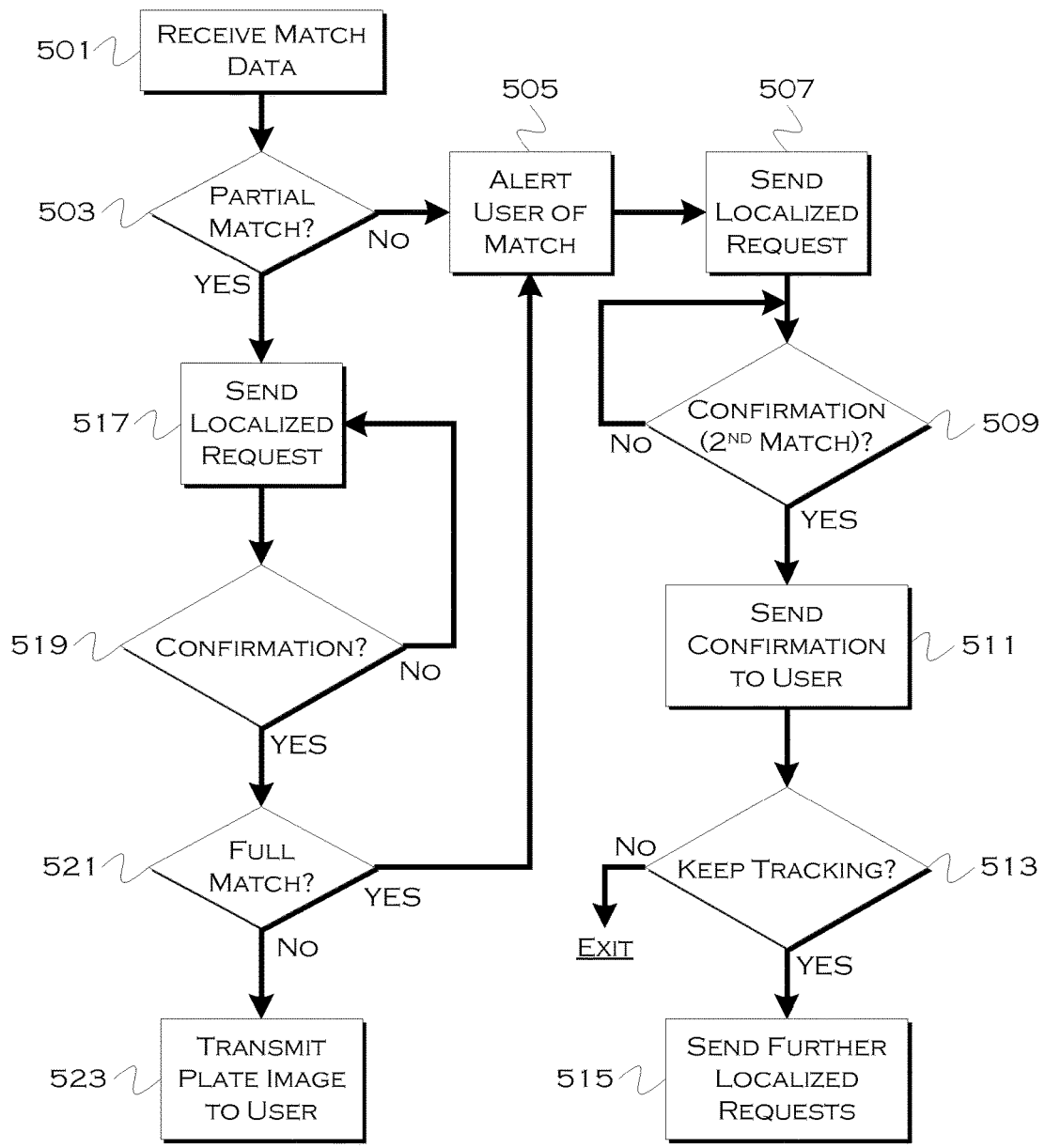
FIG. 5 shows an illustrative vehicle tracking reporting process.

FIG. 5 shows an illustrative vehicle tracking reporting process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives the confirmation of a match or partial match 501. This process will report the location of a vehicle to a requesting owner, once the vehicle is located. Once the match has been received, the process determines if the match is only a partial one 503. In some examples, partial match data may be discarded, although in this example it is used to further attempt to pinpoint the subject vehicle.

If the match is a partial one, that is, if the match is not a full match, the process then sends a localized request for confirmation to receiving vehicles in the immediate vicinity of the identified subject vehicle 517. This step is not necessary, but can be used to obtain confirmation of a vehicle location. In other examples, as noted, the location data may simply be included in the list transmission to all vehicles, although the location data now will be the location of the reported vehicle, as opposed to the initially input location.

Since, in this example, the match was only partial, the process may wait until a confirmation (i.e., a full match or another partial match) is received 519. This avoids reporting false positives to a vehicle owner. It may be the case that only a partial-confirmation is received 521, at which point this process can send a copy of the plate image to the requesting user 523. This will allow the user to visually verify the plate and whether it is affixed to the subject vehicle. On the other hand, privacy concerns may prevent transmission of anything short of a full match.

If the confirmation comes in the form of a full match 521, or if a full match was initially received 503, the process will alert the owner/requestor of the match and location of the vehicle 505. Again, in this example, a confirmation request is sent, in case the owner wants further tracking (e.g., the vehicle is moving) or to ensure that the match wasn't a false positive. Here, a localized (or appropriate variation) request can be sent 507, and when confirmation (a second full match, for example) is received 509, the process can further alert the owner 511. The process may also persist in the tracking request 513 if the user desires, which can result in further requests to vehicles 515 to help track a moving vehicle (e.g., if a vehicle is stolen). Otherwise, the process may exit.

By leveraging existing camera technology and/or wireless technology, and by anonymizing data, users can participate and are encouraged to participate in a crowdsourced vehicle tracking program. Through use of an extensive existing-vehicle network, users can quickly and accurately track down missing assets through identification of a vehicle plate, for example. This can assist a distressed owner in recovering or locating a missing vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive a locate request to find a vehicle plate;
verify that the vehicle plate is eligible as a search subject;
send a search request to a plurality of reporting vehicles for a search for the vehicle plate;
receive a match indicator from a first reporting vehicle, responsive to the search request; and
notify a requesting user of the match corresponding to the vehicle plate.

2. The system of claim 1, wherein the processor is configured to verify that the vehicle plate is eligible as a search subject by determining if the vehicle plate is listed in a registered-plate database.

3. The system of claim 1, wherein the processor is further configured to verify that a search-requesting user is eligible to perform a search for the vehicle plate specified in the locate request.

4. The system of claim 3, wherein the processor is configured to verify that the search-requesting user is eligible to perform the search by determining a correspondence between the user and the vehicle plate in a registered-plate database containing a list of vehicle plates and corresponding registered searchers.

5. The system of claim 1, wherein the processor is configured to add the vehicle plate to a list of requested vehicle plates to be sent in the search request.

6. The system of claim 1, wherein the processor is configured to add vehicle last known location data to the search request.

7. The system of claim 1, wherein the processor is configured to add a time at which a vehicle was last at a known location to the search request.

8. The system of claim 1, wherein the processor is further configured to:
receive a vehicle last-known location; and
send the search request to reporting vehicles within a predetermined proximity to the last known location.

9. The system of claim 8, wherein the processor is further configured to:
receive a time at which a vehicle was at the last known location; and
determine the predetermined proximity based on the received time.

* * * * *